United States Patent [19]

Futamura et al.

[11] Patent Number: 4,683,804

[45] Date of Patent: Aug. 4, 1987

[54] SWASH PLATE TYPE COMPRESSOR SHOE

[75] Inventors: Kenichiro Futamura; Keiichiro Ohtsu, both of Aichi, Japan

[73] Assignees: Taiho Kogyo Kabushiki Kaisha, Toyota; Toyoda Jidoshokki Seisakusho, Kariya, both of Japan

[21] Appl. No.: 734,019

[22] Filed: May 14, 1985

[30] Foreign Application Priority Data

Jan. 18, 1985 [JP] Japan ................... 60-6841
Jan. 19, 1985 [JP] Japan ................... 60-8130

[51] Int. Cl.$^4$ ............... F01B 3/00; F04B 1/12
[52] U.S. Cl. .......................... 92/71; 92/153; 417/269; 74/60
[58] Field of Search ............ 417/269; 91/488; 308/DIG. 8; 74/60; 92/71, 153

[56] References Cited

U.S. PATENT DOCUMENTS

| | | | |
|---|---|---|---|
| 3,006,324 | 10/1961 | Shaw | 74/60 |
| 3,395,948 | 8/1968 | Andrews | 91/488 |
| 3,793,923 | 2/1974 | Smith | 91/488 |
| 3,863,997 | 2/1975 | Davis | 91/488 |
| 3,933,082 | 1/1976 | Molly | 91/499 |
| 4,244,679 | 1/1981 | Nakayama | 417/269 |
| 4,261,250 | 4/1981 | Ohrberg | 91/491 |
| 4,263,814 | 4/1981 | Takaoka et al. | 74/60 |
| 4,285,640 | 8/1981 | Mukai | 417/269 |
| 4,307,998 | 12/1981 | Nakayama | 417/269 |
| 4,329,913 | 5/1982 | Nakayama | 92/71 |
| 4,381,178 | 4/1983 | Nakayama et al. | 417/269 |
| 4,420,986 | 12/1983 | Nakayama | 417/269 |

FOREIGN PATENT DOCUMENTS

| | | | |
|---|---|---|---|
| 76281 | 5/1982 | Japan | 74/60 |
| 146070 | 9/1982 | Japan | 74/60 |
| 162377 | 9/1984 | Japan | 417/269 |
| 1239386 | 7/1967 | United Kingdom | 91/499 |

Primary Examiner—Carlton R. Croyle
Assistant Examiner—Paul F. Neils
Attorney, Agent, or Firm—Berman, Aisenberg & Platt

[57] ABSTRACT

A swash plate type compressor is provided with a compressor shoe having a sliding contact surface for making sliding contact with a swash plate. The sliding contact surface is formed with a central hole. A crest portion is formed between the hole and the outer periphery of the shoe, and smooth surface portions connect the crest portion with the hole and the outer periphery, the crest portion being located substantially at or inwardly of a radially middle point of the sliding contact surface between the hole and the outer periphery.

4 Claims, 25 Drawing Figures

FIG. 1
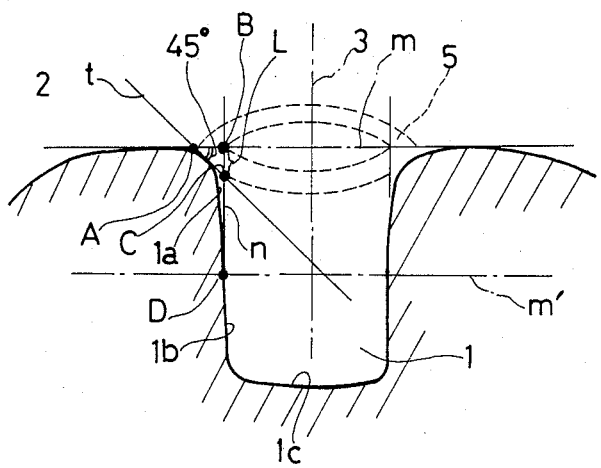
FIG. 2        FIG. 3        FIG. 4
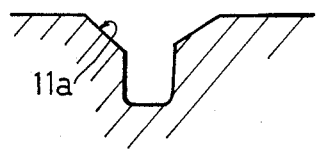 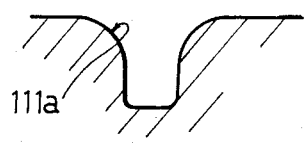 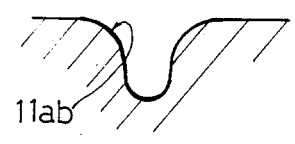
FIG. 5        FIG. 6
 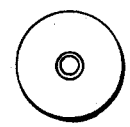
FIG. 7        FIG. 8
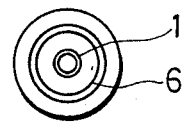 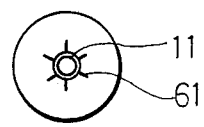

CENTRAL HOLE DIAMETER (mm)

4,683,804

SWASH PLATE TYPE COMPRESSOR SHOE

BACKGROUND OF THE INVENTION

The present invention relates to a swash plate type compressor, and more particularly to improvement in a shoe structure of a swash plate type compressor.

Heretofore, air conditioning systems of the type used, for instance, in automobiles, have employed a swash plate type compressor. This compressor has a cylinder block having a plurality of bores extending parallel to the longitudinal axis of the block, a swash plate rotated by a rotary shaft extending through the cylinder block, pistons slidably fitted in the cylinder bores, and shoes interposed between the pistons and the sliding contact surface of the swash plate through which the pistons are reciprocated by the rotary motion of the swash plate. Rotation of the rotary shaft causes sliding contact rotation of the swash plate, whereby the pistons are reciprocated to compress the refrigerant in the cylinders.

In such a swash plate type compressor, the sliding contact surface of the shoe in contact with the swash plate is acted upon by high load and the slip speed between the shoe and the swash plate is high. As a result, under conditions where the supply of lubricating oil is difficult, such as when the compressor is being started, seizure tends to take place on the sliding contact surface of the shoe, particularly at the middle of the sliding contact surface. The primary reasons why seizure tends to take place on the middle of the sliding contact surface of the shoe are as follows:

(A) Generally, in a swash plate type compressor, it has been common practice to mix lubricating oil in the refrigerant for preventing seizure. This allows the lubricating oil in the refrigerant to be present between the swash plate and the shoe. If, however, the amount of lubricating oil in the refrigerant is increased beyond a certain level, the sliding movement becomes smoother but, on the other hand, the influence of the lubricating oil detracts from the heat exchanging ability of the refrigerant and hinders the circulation of the refrigerant, resulting in a substantial decrease in cooling capability. Therefore, the smaller the amount of lubricating oil mixed in the refrigerant, the greater will be the cooling capability of the system. Thus, the current trend is to reduce the amount of lubricating oil mixed in the refrigerant, thereby increasing the tendency to seize.

(B) During the operation of the compressor, the sliding movement between the swash plate and the shoe causes the shoe temperature to reach a considerably high level of about 200° C. Since the heat of the shoe must be dissipated from the peripheral portions of the shoe which more frequently contact the refrigerant and lubricating oil, the temperature of the middle of the shoe is much higher than the temperature of the peripheral portions of the shoe, with the result that the middle of the shoe tends to bulge and project above the peripheral portion of the shoe due to thermal expansion. Thus, the load tends to be concentrated at the middle of the sliding contact surface of the shoe, increasing the tendency of the shoe to seize at the middle thereof.

(C) During the operation of the compressor, a film of the lubricating oil from the refrigerant is present between the swash plate and the shoe to ensure smooth operation of the compressor. When the compressor is stopped, however, gravity forces out this film of lubricating oil so that there is little or no oil between the swash plate and the shoe. Thus, if the compressor is started after being stopped for a long time, there will initially be a lack of lubricating oil between the swash plate and the shoe, resulting in the sliding contact surface of the shoe tending to seize.

SUMMARY OF THE INVENTION

In view of the above-described problems of conventional swash plate type compressors, the present invention provides a swash plate type compressor having improved anti-seizure characteristics.

In the swash plate type compressor of the present invention, a cylinder block, swash plate and pistons as employed in the conventional swash plate type compressor may be used.

In accordance with the invention, a swash plate type compressor is provided having a compressor shoe having a sliding contact surface for making sliding contact with a swash plate. The sliding contact surface is formed with a central hole. A crest portion is formed between the hole and the outer periphery of the shoe, and smooth surface portions connect the crest portion with the hole and the outer periphery, the crest portion being located substantially at or inwardly of a radial middle point of the sliding contact surface between the hole and the outer periphery.

BRIEF DESCRIPTION OF THE DRAWINGS

FIG. 1 is a cross-sectional view of a principal portion of a swash plate type compressor shoe according to the present invention;

FIGS. 2 through 4 are cross-sectional views showing various forms of a central hole of a shoe according to the invention;

FIG. 5 is a cross-sectional view of a sliding contact surface portion of a shoe according to the invention;

FIG. 6 is a plan view showing the sliding contact surface of the shoe of FIG. 5;

FIG. 7 is a plan view of the sliding contact surface of another shoe of the invention;

FIG. 8 is a plan view of the sliding contact surface portion of a further shoe of the invention;

DESCRIPTION OF THE PREFERRED EMBODIMENTS

Figure 9:
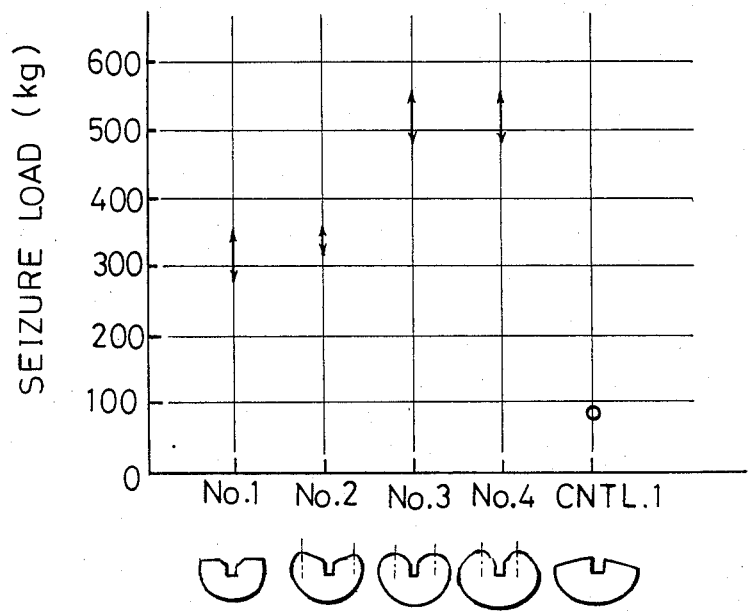
FIG. 9 is a graph showing differences in seizure loads on five types of shoes differing in the shape of their sliding contact surface.

With reference to FIG. 1, a shoe which characterizes the swash plate type compressor of the invention has a central hole 1 in the middle of a sliding contact surface making sliding contact with a swash plate. The central hole 1 is defined by an opening surface 1a continuous with the sliding contact surface 2 and flaring inwardly from the sliding contact surface 2 in a funnel-like shape. The central hole 1 is further defined by an inner wall surface 1b continuous with the opening surface 1a. Further, the central hole may either have a bottom surface 1c continuous with the inner wall surface 1b as shown in FIG. 1, or it may extend through the shoe. The former arrangement is, however, advantageous from the standpoint of retention of oil and is particularly available in the case of restarting of the engine, in which oil is not sufficiently supplied to the sliding surface.

The central hole 1 of the shoe is located at the middle of the sliding contact surface of the shoe. The central hole 1 serves mainly as an oil reservoir.

It is to be noted that, for clarity of illustration, the horizontal dimensions in FIG. 1 have been enlarged by a factor of about 100 with respect to the vertical dimensions; that is, in FIG. 1, the width of the hole 1 relative to its depth is greater by a factor of about 100 than in actuality.

The central hole 1 is characterized by an annular space 5, as seen in FIG. 1, coaxial with the central axis of the hole. Further in FIG. 1, reference character L indicates a reference distance from a point of intersection B between a sliding contact surface line m connecting the highest sliding contact surface and an axial line n which extends through a point D, which is a point of intersection between a line m' parallel to and 20 microns below the sliding contact surface line m as viewed in FIG. 1, and the wall surface 1b of the central hole and which is perpendicular to the sliding contact surface line m, to a point C, which is a point of intersection between a tangential line 5 contacting the opening surface 1a at an angle of 45 degrees and the axial line n. L is at least 3 microns in the embodiment of FIG. 1, and preferably 4 microns or more. The reason for this is that, as will be discussed in more detail below with reference to FIG. 11, better results concerning seizure load, etc., are obtained when L is 4 microns than when it is 3 microns.

The sectional shape of the opening surface may be flat, as indicated at 11a in FIG. 2, or bulgingly curved, as indicated at 111a in FIG. 3. Alternatively, as shown in FIG. 4, the opening surface and the inner wall surface which define the central hole of the shoe may be smoothly continuous with each other, as indicated at 11ab. In any event, the sliding contact surface 2 and the opening surface 1c should be made smoothly continuous with each other.

The size of the opening of the hole is determined taking into consideration the area of the sliding contact surface of the shoe, the load acting thereon, and other such factors. The wider the opening of the central hole, the more easily can the lubricating oil be fed from the central hole to the sliding contact surface. Further, if the middle portion of the shoe is abnormally heated by friction, a wider opening results in a reduced amount of projecting of the middle portion due to thermal expansion. However, if the opening of the central hole is too wide, because the area of the sliding contact surface is reduced as the width of the opening is increased, the load per unit area of the sliding contact surface will be too high. The preferable area of the opening of the central hole in a range of about 1 to 20, preferably, 1 to 25% of the sliding contact surface, more preferably, 3 to 15%.

As for the shape of the shoe, it may be a semispherical as in the prior art, or it may consist of a planar plate-like member and a ball or a modification of such a structure. In the case of a semispherical shoe, an example of which is shown in FIGS. 5 and 6, a spherical surface is in sliding contact with the piston and an approximately flat surface is in sliding contact with the sliding contact surface of the swash plate. A cross section of a semispherical shoe is shown in FIG. 5, and a plan view of a sliding contact surface is shown in FIG. 6. This semispherical shoe may be formed by cutting a steel ball into half spheres or by forging semispherical members directly.

In the case of a shoe wherein a plate-like portion and a ball portion are integrally formed, one surface of the plate-like portion serves as the sliding contact surface for making sliding contact with the swash plate, while the ball portion on the other surface makes sliding contact with the spherically recessed surface of the piston.

In a shoe having a large sliding contact surface as in the case of a large-size swash plate type compressor, the sliding contact surface, as shown in FIG. 7, may be formed with an annular groove 6 concentric with the central hole 1. Further, the sliding contact surface, as shown in FIG. 8, may be formed with grooves 61 extending radially from the central hole 11. However, care must be taken in forming these grooves since their presence reduces the sliding contact surface area.

As to the method of forming the central hole of the shoe, in the case where the shoe is formed by forging, a projection corresponding to the hole is provided on the forging die, whereby the hole can be formed simultaneously with the formation of the overall shoe. It is also possible to form the hole by pressing in a press die after the basic shoe has been formed. Also, drilling, cutting with a lathe, or another cutting method may be used.

The shoe may be made of an ordinary material such as metal or ceramics. Preferably, the shoe is made of bearing steel (such as J.I.S. (Japanese Industrial Standard) type SUJ-2) or other type of steel. To improve the anti-seizure property of the sliding contact surface of the shoe, the material of the shoe is preferably treated as by nitriding, carbonitriding, carborizing, quenching, boronizing, or sulphur-nitriding. Particularly, it is preferable to form a hard layer having a Vickers hardness (HV) of 1000 or more.

The sliding contact surface portion of the spherical surface side of the shoe is preferably coated with a layer of solid lubricant. The solid lubricant layer may be a film formed by compacting solid lubricant such as molybdenum disulfide, graphite, or fluoride resin powder with the binder such as phenol, unsaturated polyester, or epoxy resin, or it may be a film of a soft metal such as bismuth Pb, Sn, In, Tl, and alloys thereof. The solid lubricant layer may be formed on the entire surface of the shoe, or only on the sliding contact surface on the spherical surface side of the shoe.

The present invention will now be described in more detail with reference to preferred embodiments thereof.

(1) Shape of central hole, etc:

Sliding contact tests of five types of shoes having various types of holes in their sliding contact surfaces were conducted as follows:

The sliding contact surfaces of the tested five shoes (Nos. 1 to 4 and control example 1) are shown at the bottom of FIG. 9. The five shoes each had the form of a half sphere having a diameter of 13.5 mm, (sliding contact length of 12.0 mm) each was made of bearing steel (J.I.S. type SUJ-2), and each sliding contact surface was boronized to a thickness of 15 to 50 microns. The boronized layer may have a thickness of 5 to 100 microns.

As shown in FIG. 9, the middle of the sliding contact surface of each of the shoes Nos. 1 to 4 and control example 1 was formed with a hole 2.5 mm across and 1.0 mm deep. In shoe No. 1, the reference distance L shown in FIG. 1 was 6 microns in actual distance (6 mm on the scale described before in conjunction with FIG. 1), and the sliding contact surface was flat. In shoe No. 2, the reference distance L was 5 microns, and the intermediate portion between the central hole and the peripheral edge of the sliding contact surface was bulged, the highest point being located close to the peripheral edge. In shoe No. 3, the reference distance L was 5 microns, and the sliding contact surface was bulged with a highest point being at the center. In shoe No. 4, the reference distance L was 4 microns, and the sliding contact surface was bulged with the highest point being located close to the central hole. In addition, in control examples 1 and 2, the reference distance L was 0 micron (namely, sharp, right angle edge), and the sliding contact surface was downwardly sloped toward the peripheral edge. The mating material for the shoe was a disk of Aludur alloy (high Si-aluminum composed of Al, 14 to 18% Si and 2.5 to 6.0% Cu). (The upper limit of Cu is preferably 5.0%)

Tests using such disks will hereinafter be referred to as basic tests. In a first basic test A, the five types of shoes were tested for seizure load. In this test, the sliding speed was constant at 15 m/sec. The load, initially 40 kg, was increased in steps of 20 kg to measure the minimum load under which seizure took place. The mate to the shoe was a disk made of Aludur alloy (high Si-aluminum composed of Al (18%), Si (4.5%) and Cu). Lubricating oil of a conventional type was continuously fed to the disk.

The results obtained are shown in FIG. 9. From these results it can be seen that Nos. 1 to 4 are decidedly superior in anti-seizure characteristics to the control example 1. Particularly, the shoes which are bulged such that the highest point is located intermediate the central hole and the peripheral edge or located closer to the central hole, as in the case of Nos. 3 and 4, are superior.

In a second basic test, shoes Nos. 2 and 3 and control example 1 were tested for seizure load. For these tests, the shoes were made of quenched J.I.S. type SUJ-2 steel; the remainder of the conditions were the same as before.

Figure 10:
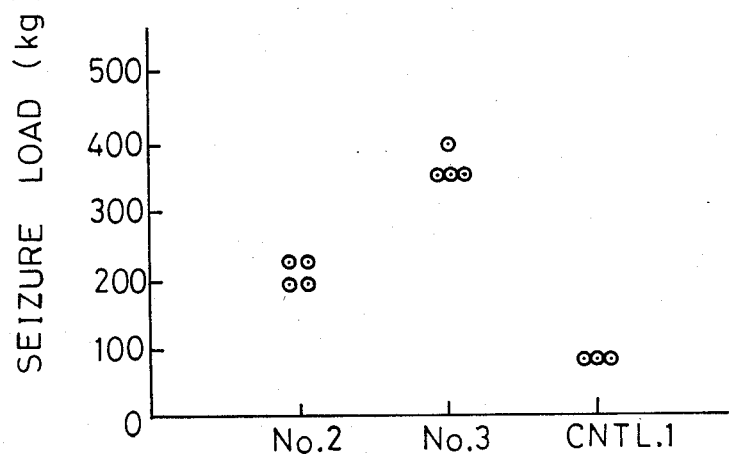
FIG. 10 is a graph showing differences in seizure loads on three types of shoes differing in the shape of their sliding contact surface.

The test results are shown in FIG. 10. As is clear from FIG. 10, shoes Nos. 2 and 3 are better from the standpoint of seizure load than control example 1.

Figure 11:
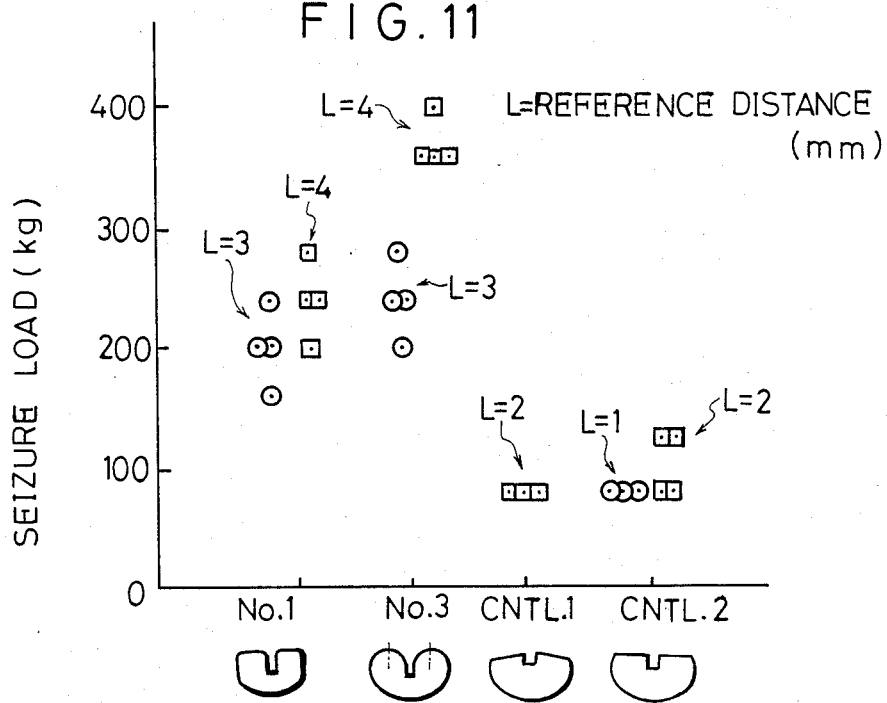
FIG. 11 is a graph showing differences in seizure loads on shoes having central holes having different reference distances.

With the above results taken into account, the relation between the reference distance L in the configuration of the central hole and the seizure load is shown in FIG. 11. In addition, in the control examples, the reference distance L was 1 and 2 microns and the sliding contact surface of control example 2 was flat. The reference distance L of shoes Nos. 1 and 3 was 3 microns and 4 microns, respectively. The seizure load was found to be high, that is, the anti-seizure property was good, in the latter two cases compared with the control examples.

(2) Hardness of sliding contact surface layer of shoe:

To evaluate the effect of the hardness of the sliding contact surface layer of the shoe, the following basic test was conducted.

Half spheres with a diameter of 13.5 mm made of bearing steel (J.I.S. type SUJ-2) quenched to a Vickers hardness HV 760 were used as shoes. The bottom surfaces of the shoes were formed with a single central hole having a diameter of 2.5 mm. The sliding contact surfaces of different ones of the shoes were subjected to various surface treatments. The time before seizure occurred was measured in the following test B.

The test conditions were: load, 12 kg; sliding speed, 5 m/sec; and lubricating oil, mixture of 1 part refrigerator oil and 9 parts light oil, only one drop of the lubricating oil being fed to the shoe, whereafter the sliding contact test was conducted with no further supply of lubricating oil to measure the time before seizure occurred.

In accordance with the load seizure test A, four types of shoes were tested: No. 6 shoe made of quenched J.I.S. type SUJ-2 steel (HV 760), No. 7 shoe made of J.I.S. type SCM-12 carborized steel (HV 840), No. 8 shoe made of nitrided steel (HV 1000), and No. 9 shoe made of boronized J.I.S. type SCJ-2 steel (HV 1500).

Figure 12:
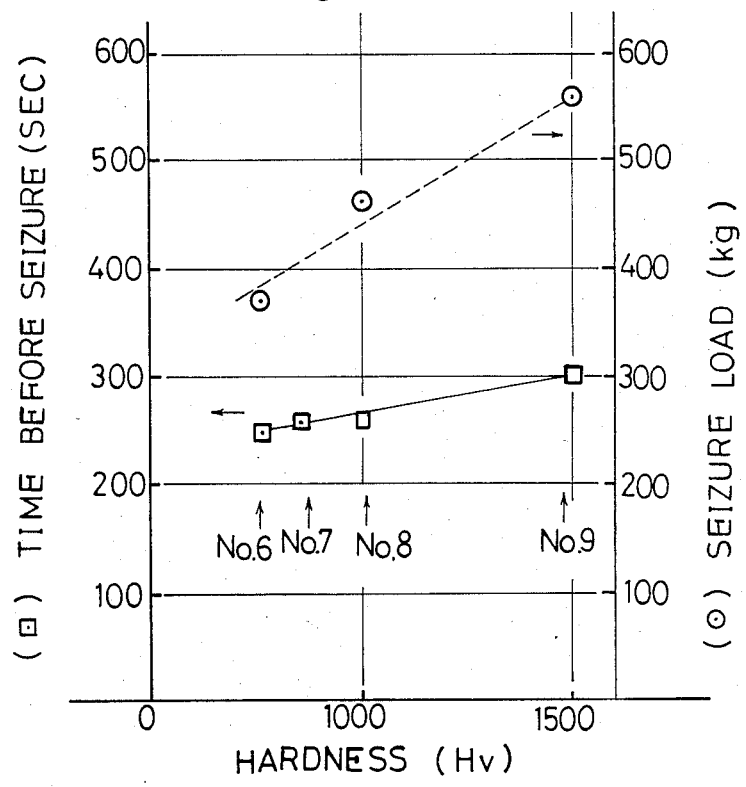
FIG. 12 is a graph showing differences in the time taken for seizure to occur and in seizure load for four types of shoes differing in the hardness of their sliding contact surface.

As is clear from the results of test A shown FIG. 12, the seizure load for the surface-treated shoes Nos. 7 to 9 is higher than for the No. 6 shoe having no surface treatment. Particularly, from the results of test B the time before seizure is longer. In general, the greater the hardness, the better results the shoe provides.

Secondly, to evaluate the effects of the hardness of the sliding contact surface layer of the shoe under the initial starting conditions of an actual machine, an actual machine test was conducted using the same materials as in the first test. The term initial starting conditions refers to the severe conditions of starting the compressor immediately after gas enclosure.

The shoes used were of four types: the aforementioned No. 6 shoe, an SACM nitrided shoe (11 mm $\phi$, central hole diameter 4 mm $\phi$, No. 8A), a boronized shoe (10 mm $\phi$, central hole diameter 3 mm $\phi$, No. 9A), and a boronized shoe (11 mm $\phi$, central hole diameter 4 mm $\phi$, No. 9B). The test results are shown in Table 1.

TABLE 1

|  | 3000 | 4000 | 5000 | rpm |
|---|---|---|---|---|
| No. 6 | o | x | x |  |
| No. 8 | o | o | x |  |
| No. 9A | o | o | x |  |

TABLE 1-continued

|  | 3000 | 4000 | 5000 | rpm |
|---|---|---|---|---|
| No. 9B | o | o | o | |

According to Table 1, at 4000 rpm, the shoes untreated for hardening develop seizure, but the shoes treated for hardening develop no seizure. At 5000 rpm, the No. 9B shoe, having a higher hardness, develops no seizure.

Thirdly, a wear test of an actual machine using three types of shoes, specifically, shoes Nos. 8A, 9A and 9B, was conducted. The amount of wear reduction in (thickness) after running at 5500 rpm for 100 hours was measured. The results are shown in Table 2. As Table 2 shows, the greater the hardness of the sliding contact surface of the shoe, the less the amount of wear. Particularly, the amount of wear of the No. 9B shoe is very small, only about 1 to 2 microns. For conventional shoes, the amount of wear under similar conditions is about 30 to 100 microns.

TABLE 2

|  | Amount of wear (thickness) of shoe |
|---|---|
| No. 8 | 3–6 microns |
| No. 9A | 2–4 |
| No. 9B | 1–2 |

(3) Size of central hole:

A basic test was conducted to evaluate the effect of the size of the central hole on the time before seizure and on the seizure load. Seven types of shoes whose central hole diameter was 0 (no hole), 1, 2, 2.7, 3, 4 and 5 mm, respectively, were used. The material of each shoe was J.I.S. type SUJ-2 steel, the shoe diameter was 12 mm $\phi$, and the depth of the central hole was 1.0 mm. The results of these tests are shown in FIG. 13.

Figure 13:
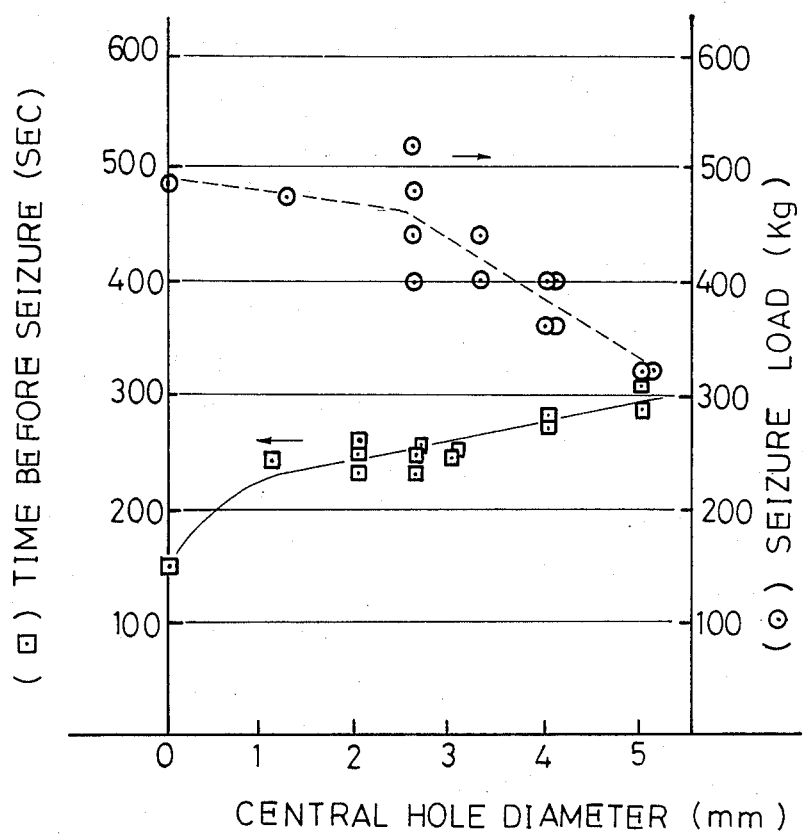
FIG. 13 is a graph showing differences in the time taken for seizure to occur and in seizure load for five types of shoes differing in the diameter of their central hole.

According to FIG. 13, as is clear from test B, the larger the central hole diameter of the shoe, the longer the time before seizure occurs, that is, the better the anti-seizure characteristics. However, as is clear from test A, although the tendency to seize decreases as the diameter of the central hole increases, the load capacity drops.

Figure 14:
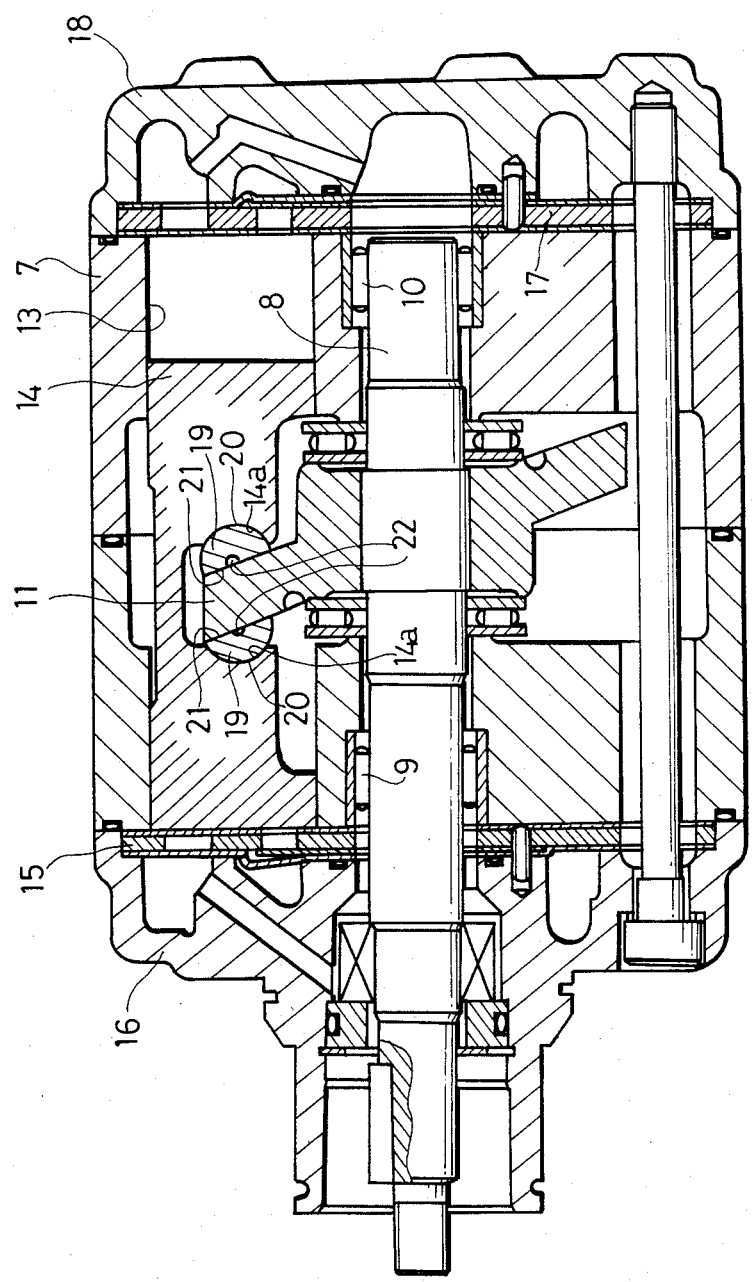
FIG. 14 is a cross-sectional view of a preferred embodiment of a swash plate type compressor of the invention.

(4) Swash plate type compressor:

FIG. 14 shows a sectional view of a swash plate type compressor according to the present invention. In FIG. 14, reference numeral 7 denotes a cylinder block within which a rotary shaft 8 is rotatably supported by bearings 9 and 10. The rotary shaft 8 has a swash plate 11 fixed thereto. The cylinder block 7 is formed with a plurality of cylinder bores 13, in each of which a piston 14 is slidably fitted. The left end opening in the cylinder block 7 is closed by a valve plate 15 and front cylinder head 16, while its right end opening is closed by a valve plate 17 and rear cylinder head 18.

The middle portion of each piston 14 is formed with spherical recesses 14a. Reference numeral 19 denotes semispherical shoes each having a spherical surface 20 for making sliding contact with the spherical recess 14a in the piston, a flat sliding contact surface 21 for making sliding contact with the sliding contact surface of the swash plate 11, and a central hole 22. The above arrangement is basically the same as the construction of the conventional swash plate type compressor. However, by employing shoes of the improved types discussed above, the anti-seizure characteristics of the compressor are greatly improved.

Figure 15:
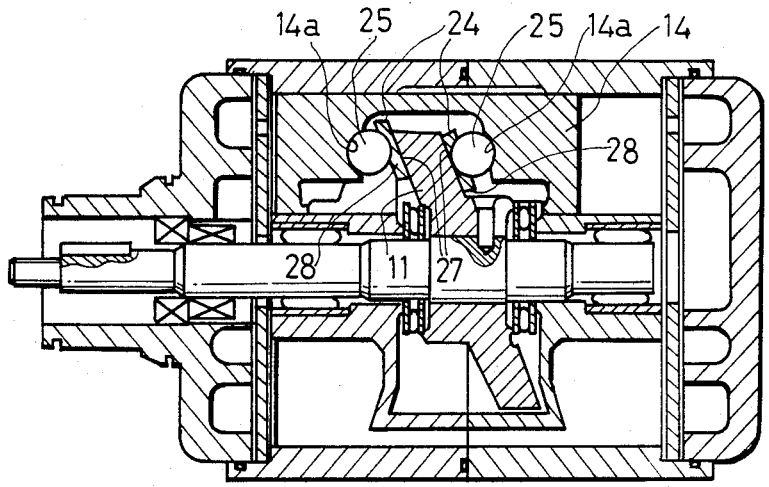
FIG. 15 is a cross-sectional view of a swash plate type compressor having flat plate-like shoes.

The shoe employed in the compressor of FIG. 14 is a semispherical shoe as discussed above. Otherwise, as shown in FIG. 15, a flat plate-like shoe 24 and a ball 25 may be used. In this case, the flat plate-like shoes 24 are in sliding contact with the swash plate 11 with the balls 25 interposed between the spherical recesses 14a of the pistons 14 and the spherical recesses of the shoes. In this example, as in the above embodiment, the middle of the sliding contact surface of each shoe 24 is formed with a central hole 28 serving as an oil reservoir.

In the swash plate type compressor of the present invention as described above, the sliding contact surface of the shoe for making sliding contact with the swash plate is formed with a central hole having an opening surface of predetermined shape. This central hole serves as an oil reservoir for lubricating oil. With the swash plate type compressor of the invention, a smaller amount of lubricating oil can be mixed with the refrigerant while still an adequate amount of the oil is supplied to the sliding contact surfaces of the shoe at all times. Further, even if the swash plate type compressor is operated for a long time under severe conditions which cause the middle of the sliding contact surface to be concentratedly heated to a high temperature and producing thermal expansion which tends to urge the sliding contact surface of the shoe to project outwardly, the central hole of the shoe according to the invention accommodates the thermal expansion to prevent the sliding contact surface of the shoe from projecting. Thus, the middle of the sliding contact surface of the inventive shoe will seldom be acted upon by high local load. For this reason, seizure is substantially eliminated.

Figure 16:
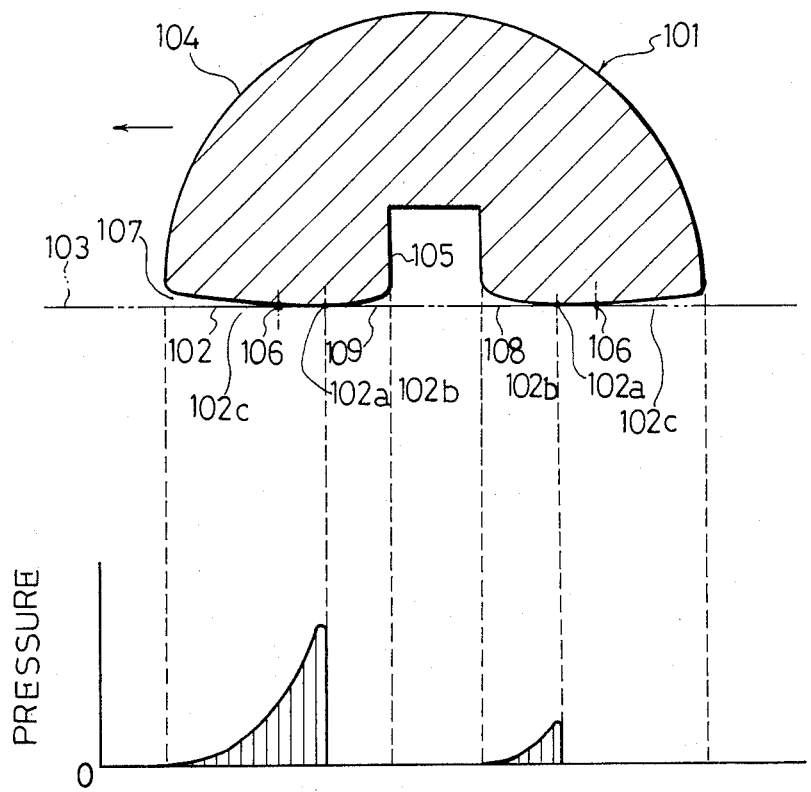
FIG. 16 is a cross-sectional view of another embodiment of a swash plate type compressor of the present invention showing the distribution of oil pressure produced when a shoe is moved in the direction of an arrow.

The present invention will now be further described with reference to another embodiment. In FIG. 16, a shoe 101 is generally semispherical. The shoe 101 has a sliding contact surface 102 on its bottom end surface which makes sliding contact with a swash plate 103, and a sliding contact surface 104 in semispherical form opposite to the sliding contact surface 102 which makes sliding contact with a spherical recess in a piston (not shown). The middle portion of the sliding contact surface 102 is formed with a bottomed hole 105.

The sliding contact surface 102 between the hole 105 and the outer periphery of the shoe 101 is a convex surface composed of an apex surface 102a, a surface 102c smoothly continuous with the side of the hole 105 from the crest surface and lower than the crest, and a surface 102c smoothly continuous with the other side from the crest surface 102a and lower than the crest. The crest 102a of the convex surface is located substantially at or inwardly of the radial middle portion 106 of the sliding contact surface between the hole 105 and the outer periphery of the shoe 101.

The convex surface is of the same shape with respect to the circumferential direction, and hence the crest 102a is circumferentially continuous for sliding contact with the swash plate 103. The sliding contact surface 102 and the inner peripheral surface of the hole 105 of the shoe 101, or the surface 102b located on one side of the crest 102a and the inner peripheral surface of the hole 105, are continuous with each other through a smooth arc, while the portion between the surface 102c located on the other side of the crest 102a and the outer peripheral surface of the shoe 101 is a smooth arc so as not to produce an angular corner.

According to the arrangement described above, the sliding contact surface 102 of the shoe 101 makes sliding contact with the swash plate 103 at the crest 102a, and hence, as shown in the sectional view of FIG. 11, the shoe 101 and the swash plate 103 make sliding contact with each other at two points on the crest 102a. Thus, when the shoe 101 is moved relative to the swash plate 103 in the direction of the arrow in FIG. 16, wedge effects produced by clearances 107 and 108 between the swash plate 103 and the sliding contact surface located forwardly of the crest 102a as viewed in the direction of movement satisfactorily introduce lubricating oil into the space between the sliding contact surface 102 and the swash plate 103 to produce high positive oil film pressures.

On the other hand, in a clearance 109 between the swash plate 103 and the sliding contact surface located forwardly of the crest 102a as viewed in the direction of movement, there is produced a negative pressure. However, since the crest 102a is located substantially at or inwardly of the radial middle portion 106 so as to reduce the size of the negative pressure-producing region, and since the negative pressure is at most about one atmosphere (much smaller than typical positive oil film pressures), the shoe 101 is capable of making smooth sliding contact with the swash plate 103 due to the oil film pressures, which are high as a whole.

Of the two clearances 107 and 108 between the swash plate 103 and the sliding contact located forwardly of the crest 102a as viewed in the direction of movement, the clearance 107 located forwardly as viewed in the direction of movement and which ensures satisfactory supply of lubricating oil has a higher oil film pressure; thus, it is desirable that the crest 102b be located as far inwardly of the radial middle portion 106 as possible, or toward the middle of the shoe 101. However, if the crest 102a is too close to the hole 105 of the shoe 101, the radius of curvature of the surface 102b positioned between the crest 102a and the hole 105 will be very small, resulting in the crest 102a dragging the swash plate 103 and degrading the anti-seizure characteristics of the compressor.

Figure 17:
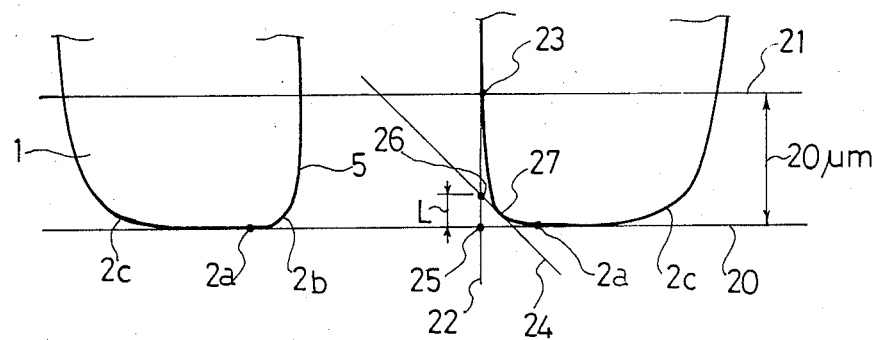
FIG. 17 is an explanatory view for explaining the innermost position of the crest of a sliding contact surface.

FIG. 17, a diagram provided for explaining the innermost position of the crest 102a, showing the shape of the bottom of the shoe 101. In this figure, similar to FIG. 1, the vertical scale is about 100 times that of the horizontal scale. In FIG. 17, a line 120 connects the crest 102a of the sliding contact surface, a line 121 is parallel to the line 120 and spaced 20 microns apart from the line 120 toward the shoe 101, a line 122 is drawn through a point of intersection 123 between the line 121 and the inner peripheral surface of the hole 105 and perpendicular to the line 120, and a line 124 is drawn at an angle of 45° through a point 126 which is spaced a reference distance L of 4 microns or more from a point of intersection 25 between the lines 20 and 22. An arc 127 is drawn with a radius of curvature such that it contacts the lines 124 and 120 and is smoothly continuous with the inner peripheral surface of the hole 105. The point where the arc 127 contacts the line 120 is determined as the innermost position of the crest 102a.

The effectiveness of the invention will now be described with reference to test results shown in FIG. 18. This test measured the anti-seizure property of the shoe. More particularly, a swash plate 103, which was made of an alloy, consisting of 14 to 18 wt% Si, 2.5 to 6 wt% Cu, and the balance Al, was placed in sliding contact with the shoe 101, which was made of ordinary steel subjected to boronizing (HV 1300 to 1500) to a thickness of 10 to 15 microns. According to the invention, the Si component of the aluminum alloy may be 11 to 24%. The lubricating oil was prepared by mixing refrigerator oil and light oil in a ratio of 1:9. The shoe 101 was pressed against the swash plate 103 initially with a load of 40 kg, and the load was increased in steps of 20 kg. The final load at which seizure took place was measured. The relative slip speed between the shoe 101 and the swash plate 103 was set to 15 m/s.

Figure 18:
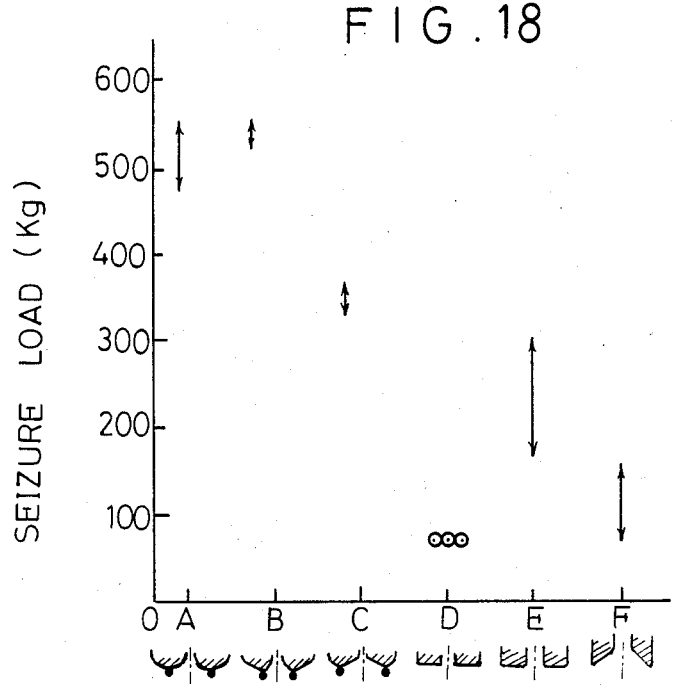
FIGS. 18 and 19 are graphs showing test results of an anti-seizure characteristic.

In FIG. 18, A and B refer to shoes of the invention. In shoe A, the crest 102a was located at the middle portion 106, and in shoe B, the crest 102a was located inwardly of the sliding surface at a position which was about 1/5 of the distance between the hole 105 and the outer peripheral surface of the shoe 101. According to the present invention, it is preferable that the crest be located inwardly of the sliding surface at a position which is 4/9 of the distance. In comparison with the ratio ½, it is preferable to locate the crest at the ratio 1/5 because of its uniform performance.

C to F refer to control examples. In shoe C, the sliding contact surface was a convex surface as in the present invention, but the crest 102a was located outwardly of the middle portion 106 at a position which was about ¼ of the distance between the hole 105 and the outer peripheral surface of the shoe 101. In shoe D, the whole sliding contact surface was flat and the connecting portion between the sliding contact surface and the hole and the connecting portion between the sliding contact surface and the outer peripheral surface were angular; in shoe E, the connecting portion between the sliding contact surface and the hole and the connecting portion between the sliding contact surface and the outer peripheral surface were arcuate; and in shoe F, the middle of the sliding contact surface was conically recessed and the connecting portions between the sliding contact surface and the hole and the connecting portions between the sliding contact surface and the outer peripheral surface were arcuate.

As can be understood from the test results shown in FIG. 18, the inventive examples A and B provide better results than the control examples C to F.

Figure 19:
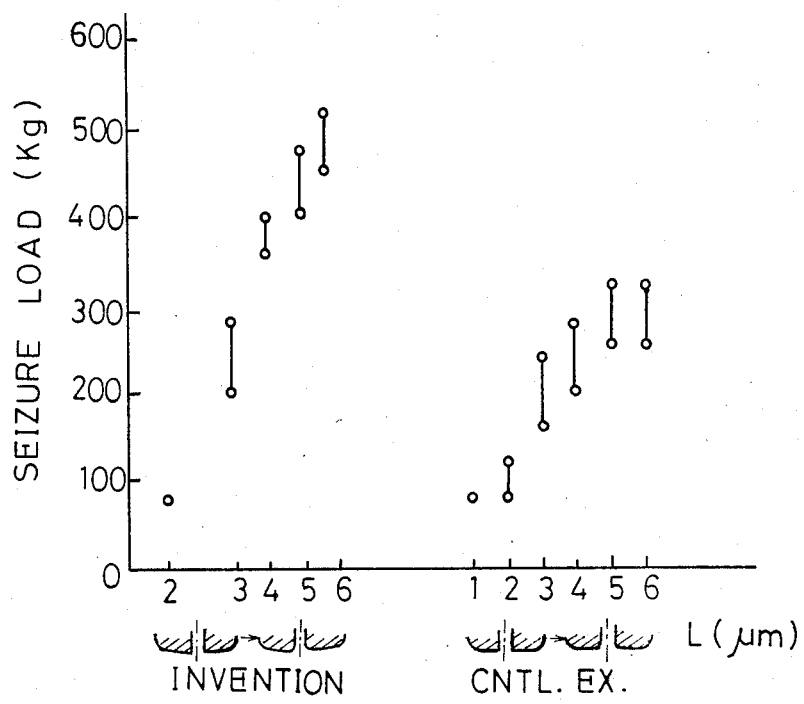

FIG. 19 shows test results concerning the innermost position of the crest 102a, wherein changes in the anti-seizure characteristics were measured as the distance L was gradually changed. The test conditions were the same as in case of FIG. 18.

In FIG. 19, the portion between the sliding contact surface and the outer peripheral surface of the shoe was formed with a large radius of curvature, and the distance L in the connecting portion between the sliding contact surface and the inner peripheral surface of the hole was varied to observe the influence on the anti-seizure characteristics.

As can be understood from the same figure, in the control examples whose sliding contact surface was flat, the anti-seizure characteristic improved as the distance L was increased, but no improvement in anti-seizure characteristics were observed if L exceeded 5 microns. Consequently, no large improvement in anti-seizure characteristics can be obtained. In contrast thereto, in the examples of the invention, by setting the distance L at 5 microns, as a minimum the same anti-seizure characteristics as the best attainable by the control examples can be obtained, while by increasing the distance L, the anti-seizure characteristics can be further improved.

In the above-discussed embodiment, semispherical shoes are employed, but it goes without saying that the invention is also applicable to shoes using balls.

In accordance with another aspect of the present invention, the shoes described above may be subjected to the following surface treatments, in order to further improve a power loss and a durability.

Figure 20:
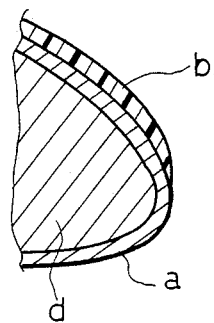
FIGS. 20 through 22 are cross-sectional views showing still further embodiments of shoes for swash plate type compressors of the invention.
Figure 21:
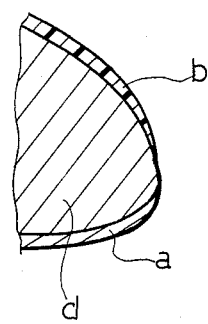

The shoes to which the surface treatment is applied according to the present invention is characterized in that a surface layer b of the shoe contains solid lubricant as shown in FIGS. 20 and 21. The applicable solid lubricants comprise $MoS_2$, graphite, BN (boron nitride) $WS_2$, PTFE (polytetrafluoroethylene) resin or the like. A suitable solid lubricant should be selected in accordance of a use and an object.

The above described sliding surface layer is applied to a desired location of the shoe by mixing a phenol resin as a binder with the solid lubricant. Also, the sliding surface layer may be include a soft metal such as Pb, bismuth or the like. The thickness of the surface layer is preferably below 10 microns, more preferably below 7 microns and most preferably below 5 microns.

As shown in FIG. 20, the sliding surface layer b may be formed over the spherical surface of the shoe but the sliding surface layer b may be formed over the entire sliding surface of the shoe.

Figure 22:
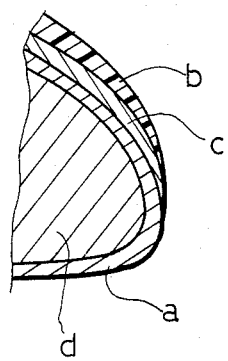

As shown in FIG. 22, the sliding surface layer may be formed on an under layer c. The underlayer may comprise manganese phosphate, zinc phosphate chromate and nitride. Also, the underlayer may be dispensed with as shown in FIG. 21.

In accordance with the present invention, the sliding surface layer is formed as follows: First of all, a material to be processed is degreased by a suitable alkali liquid and subsequently, an underlayer such as a manganese phosphate layer is formed on the degreased surface of the material. In this case as desired, a reaction accelerating agent may be added to reduce a processing period of time. Thereafter, a coating material is applied thereto by spraying, tanbling, dipping or brushing. The coated material is sintered under suitable conditions to thereby form the sliding surface layer. Incidentally, in order to prevent an operational noise due to gaps formed by frictional reduction of the coating layer, it is preferable that a thickness of the coating layer be less than a predetermined value.

Examples of the present invention will now be described in which the shoes were surface processed. FIG. 22 shows a cross-section of a primary part of a shoe obtained in accordance with the present invention. Reference character d designates a shoe base member. The shoe base member, such as this type SUJ-2 or S 45 C steel, was subjected to a boronizing surface process to form a boronized layer a over the entire outer periphery of the shoe base d. In the boronizing process, a boronizing processing agent $B_4hC+SIC+C+KBF_2$ was used. The shoe base was held in the processing agent from which oxygen was excluded, and heated at a temperature of 800° to 1000° for 5 to 10 hours. The processed shoe was further subjected to processing to form a manganese phosphate layer b and $MoS_2$ layer c (binded $MoS_2$) in a manner well known in the art.

Figure 23:
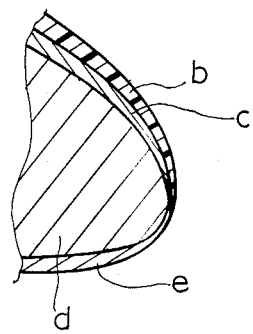
FIG. 23 shows a comparison example of a shoe.

FIG. 23 shows comparison examples. In the comparison examples, the sliding contact surface for an associated swash plate was subjected to a well-known quenching process. Then, a manganese phosphate layer b and $MoS_2$ layer c were provided thereon in the conventional manner. The shoe may be subjected to a well-known hardening process to form a hardened layer e.

The associated or mating disc for the above-described examples were made of Al, Si (16 to 18 wt%), Cu (4 to 6 wt%), and Mg (0.4 to 0.6 wt%), and had a hardness of HV 1000 to 1200.

The power loss of the compressor is affected by the sliding characteristics between the spherical surface and the sliding contact surface of the shoe. The power loss was measured in a compressor 150 cc displacement capacity. Seizure loads affect the property of the slide contact surface of the shoe.

Figure 24:
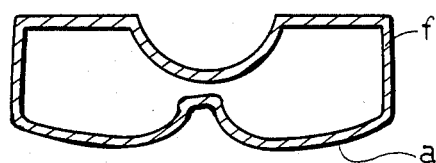
FIGS. 24 and 25 show examples of the Cu layers applied to the shoe in accordance with the present invention.
Figure 25:
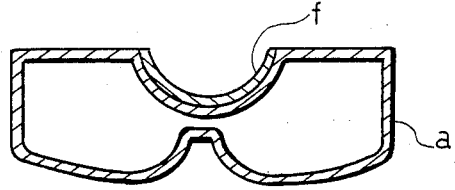

It is possible to form a Cu layer f on shoe base member, except for the sliding contact surface in contact with an associated Al swash plate, as shown in FIGS. 24 and 25.

TABLE 3

| Test piece | | Slide surface Material | Hardness | Spherical Surface | Power loss (Hp/Ton) 1000 rpm | 2000 rpm | Seizure load (Kg) |
|---|---|---|---|---|---|---|---|
| Invention | 1 | boronating process | Hv 1300 | O | 2.40 | 2.65 | 520–560 |
| | 2 | TiC | Hv 2800 | O | 2.40 | 2.63 | 520–600 |
| | 3 | VC | Hv 3500 | O | 2.40 | 2.63 | 520–600 |
| Comparison | 4 | S45C quenching | Hv 550 | O | 2.47 | 2.69 | 280–360 |
| | 5 | SUJ-2 | Hv 800 | O | 2.43 | 2.68 | 320–400 |
| | 6 | SUJ-2 | Hv 800 | X | 2.50 | 2.75 | 320–400 |
| | 7 | boronating process | Hv 1300 | X | 2.52 | 2.80 | 520–560 |

O designate the shoe having a spherical surface.
X designate the shoe having no spherical surface.

We claim:

1. In a swash plate type compressor shoe having a sliding contact surface for making sliding contact with a swash plate, said sliding contact being formed with a hole, the improvement wherein a sliding contact surface between said hole and an outer periphery of said shoe is formed as a convex surface comprising a crest portion and surfaces smoothly continuous with both sides of said crest portion and lower than said crest portion, said crest portion being located substantially at or inwardly of a radial middle point of said sliding contact surface between said hole and said outer periphery of said shoe.

2. The swash plate type compressor shoe of claim 1, wherein said radial middle point is located at about 4/9–1/5 of said sliding contact surface.

3. The swash plate type compressor shoe of claim 1, wherein said convex surface and an inner peripheral surface of said hole are continuous with each other through a smooth arc.

4. The swash plate type compressor shoe of claim 1, wherein said convex surface and said outer periphery of the shoe are continuous with each other through a smooth arc.

* * * * *